United States Patent [19]

Harris et al.

[11] Patent Number: 4,775,461

[45] Date of Patent: Oct. 4, 1988

[54] CRACKING PROCESS EMPLOYING CATALYSTS COMPRISING PILLARED CLAYS

[75] Inventors: Jesse R. Harris; David R. Battiste; Brent J. Bertus, all of Bartlesville, Okla.

[73] Assignee: Phillips Petroleum Company, Bartlesville, Okla.

[21] Appl. No.: 146,524

[22] Filed: Jan. 21, 1988

Related U.S. Application Data

[62] Division of Ser. No. 8,711, Jan. 29, 1987, Pat. No. 4,742,033.

[51] Int. Cl.$^4$ .................. C10G 11/04; C10G 11/05
[52] U.S. Cl. .................. 208/120; 208/113; 208/119; 208/121; 502/84; 502/68
[58] Field of Search .................. 208/113, 120, 121; 502/84, 68

[56] References Cited

U.S. PATENT DOCUMENTS

| | | | |
|---|---|---|---|
| 3,892,655 | 7/1975 | Hickson | 208/111 |
| 4,010,116 | 3/1977 | Secor et al. | 502/68 |
| 4,060,480 | 11/1977 | Reed et al. | 208/111 |
| 4,176,090 | 11/1979 | Vaughan et al. | 252/455 Z |
| 4,216,188 | 8/1980 | Shabrai et al. | 423/118 |
| 4,238,364 | 12/1980 | Shabtai | 252/455 R |
| 4,248,739 | 2/1981 | Vaughan et al. | 252/455 R |
| 4,271,043 | 6/1981 | Vaughan et al. | 252/455 R |
| 4,364,848 | 12/1982 | Castillo et al. | 252/417 |
| 4,377,470 | 3/1983 | Hettinger, Jr. et al. | 208/120 |
| 4,420,419 | 12/1983 | Ogawa et al. | 502/68 |
| 4,424,116 | 1/1984 | Hettinger, Jr. | 208/120 |
| 4,452,910 | 6/1984 | Hopkins et al. | 502/84 |
| 4,458,023 | 7/1984 | Welsh et al. | 502/65 |
| 4,465,779 | 8/1984 | Occelli et al. | 502/84 |
| 4,476,239 | 10/1984 | Chiang et al. | 502/68 |
| 4,608,357 | 8/1986 | Silverman et al. | 208/113 |
| 4,629,712 | 12/1986 | Pinnavaia et al. | 502/84 |
| 4,636,484 | 1/1987 | Nishimura et al. | 502/68 |
| 4,637,991 | 1/1987 | Battiste et al. | 502/68 |
| 4,665,044 | 5/1987 | Pinnavaia et al. | 502/84 |
| 4,665,045 | 5/1987 | Pinnavaia et al. | 502/84 |
| 4,666,877 | 5/1987 | Vaughan | 502/84 |
| 4,708,786 | 11/1987 | Occelli | 208/120 |

OTHER PUBLICATIONS

"Soil Chemical Analysis—Advanced Course" by M. L. Jackson, 2nd Edition, 11th Printing, 1979, pp. 44–51.
"Petroleum Refining", by J. H. Gary and G. E. Handwerk, Marcel Dekker, Inc., 1975, pp. 86–95.

*Primary Examiner*—Anthony McFarlane
*Attorney, Agent, or Firm*—K. K. Brandes

[57] ABSTRACT

A process for catalytic cracking using a catalyst obtained by preparing pillared interlayered clay materials comprises the steps of contacting a smectite containing material, preferably bentonite, with a solution comprising at least one of ammonium and alkali metal carboxylates and alkali metal carbonates and bicarbonates, plus preferably also alkali metal dithionite; separating the thus-contacted material from the solution; treating the separated material with a solution comprising a polymeric cationic hydroxy metal complex, preferably of aluminum (more preferably, polymeric hydroxy aluminum chloride); separating and finally heating the thus-treated smectite material. The pillared interlayered clay material of this invention can be intimately admixed with zeolite. The pillared interlayered clay material of this invention, with or without zeolite, can be used as catalyst for cracking hydrocarbon-containing oils.

35 Claims, No Drawings

CRACKING PROCESS EMPLOYING CATALYSTS COMPRISING PILLARED CLAYS

This is a division of Ser. No. 008,711, filed Jan. 29, 1987, now U.S. Pat. No. 4,742,033.

BACKGROUND OF THE INVENTION

This invention relates to a process for preparing pillared interlayered clays. In another aspect, this invention relates to pillared interlayered clays having improved cracking activity. In a further aspect, this invention relates to cracking catalysts comprising pillared interlayered clays having improved cracking activity. In yet another aspect, this invention relates to a process for cracking hydrocarbon-containing feed streams employing catalysts comprising pillared interlayered clays having improved cracking activity.

The preparation of pillared interlayered clay compositions by reacting a smectite-type clay with an aqueous solutions of suitable polymeric cationic hydroxy metal complexes of metals, such as aluminum, titanium, zirconium and chromium, is well known. Upon dehydration of the reaction product, there results a smectite clay which includes additional metal oxide, such as oxide of Al, Ti, Zr or Cr, in the form of pillars interspersed between the clay layers, as is illustrated in U.S. Pat. Nos. 4,238,364, 4,216,188 and 4,176,090, herein incorporated by reference. Even though these known clay products having interspersed pillars of metal oxide, such as oxide of Al, Ti, Zr or Cr, (said products being referred to hereinafter as pillared interlayered clays) exhibit various advantages over untreated smectite clays and can be used as cracking catalysts or components thereof, there is an ever present need to develop new pillared interlayered clays possessing further improved surface properties, steam stability and cracking activity.

SUMMARY OF THE INVENTION

It is an object of this invention to provide a process for preparing improved pillared interlayered clays. It is another object of this invention to treat smectite clays with solutions of suitable inorganic compounds before the reaction of said smectite clays with a polymeric cationic hydroxy metal complex of a suitable metal, preferably aluminum. It is a further object of this invention to provide pillared interlayered clays exhibiting greater steam stability and enhanced surface area after steam treatment. It is a still further object of this invention to provide steam-stable pillared interlayered clays having improved cracking activity. It is still another object of this invention to provide a process for catalytically cracking hydrocarbon-containing feedstocks employing steam-stable pillared interlayered clays. Other objects and advantages will be apparent from the detailed description and the claims.

In accordance with this invention, a process for preparing a pillared interlayered clay materials comprises the steps of (a) contacting a smectite clay containing material with a solution (preferably aqueous) comprising at least one dissolved carbon and oxygen containing compound (i.e., one compound or a mixture of two or more compounds) selected from the group consisting of ammonium carboxylates containing from 1 to 20 carbon atoms per carboxylate group, alkali metal carboxylates containing from 1 to 20 carbon atoms per carboxylate group, alkali metal bicarbonates and alkali metal carbonates, at a temperature of at least 20° C. (preferably in the range of from about 20° to about 100° C.) and for a period of time of at least one minute (preferably in the range of from about 5 minutes to about 100 hours);

(b) separating the clay product formed in step (a) from said contacting solution;

(c) contacting the clay product which has undergone treatment comprising steps (a) and (b) with a solution (preferably aqueous) comprising at least one polymeric cationic hydroxy metal complex of at least one metal (i.e., one or mixtures of two or more metals) selected from the group consisting of aluminum, titanium, zirconium and chromium (preferably Al), under such conditions as to increase the content of said metal in said clay product having undergone treatment comprising steps (a) and (b);

(d) separating the clay product having increased metal (preferably Al) content formed in step (c) from said solution comprising the polymeric cationic hydroxy metal complex; and (e) heating the separated clay product having increased metal content obtained in step (d) under such conditions as to remove at least a portion of water from said separated clay product obtained in step (d) so as to form a pillared interlayered clay.

We have discovered that a superior pillared, interlayered clay is obtained when steps (a) and (b) are carried out before steps (c), (d) and (e). Preferably, the solution used in step (a) additionally comprises at least one alkali metal dithionite. In the presently more preferred embodiment, the solution used in step (a) is an aqueous solution comprising (most preferably consisting essentially of) water, sodium citrate, sodium bicarbonate and sodium dithionite. The preferred polymeric cationic hydroxy metal complex used in step (c) is a polymeric cationic hydroxy aluminum complex (compound), more preferably polymeric hydroxy aluminum chloride.

In another preferred embodiment, the process of this invention comprises the additional step [after step (b) and before step (c)] of (b1) contacting the separated clay product obtained in step (b) with a solution comprising (preferably consisting essentially of) water and at least one dissolved compound selected from the group consisting of inorganic ammonium compounds, compounds of Group IIA metals (alkaline earth metals) and compounds of lanthanides (elements of atomic number 57-71), so as to incorporate ionic species selected from the group consisting of ammonium ion, Group IIA metal ions, lanthanide ions and mixtures of two or more of these ions into said clay product obtained in step (b).

More preferably, the process of this invention also comprises the additional step of (b2) separating said clay product obtained in step (b1) from said aqueous solution used in step (b1).

In the preferred embodiment described immediately above, step (c) is then carried out with the ion-exchanged clay product obtained in step (b1) or, more preferably, the product obtained in step (b2) [in lieu of the clay product obtained in step (b)]. Also more preferably, said group of at least one compound employed in step (b1) comprises halides and nitrates of ammonium, magnesium and lanthanides (most preferably La).

Further in accordance with this invention, there is provided a composition of matter comprising (preferably consisting essentially of) pillared interlayered clay which has been prepared by the process comprising steps (a), (b), (c), (d) and (e) or, alternatively (preferably), by the process comprising the steps of (a), (b), (b1), (c), (d) and (e), optionally also comprising step (b2). In one embodiment, said pillared interlayered clay is admixed with zeolite.

Further in accordance with this invention, a cracking process is provided comprising the step of contacting a substantially liquid hydrocarbon-containing feed stream with a solid catalyst composition comprising a pillared interlayered clay having been prepared by the process comprising steps (a), (b), (c), (d), and (e), or, alternatively (preferably), by the process comprising steps (a), (b), (b1), (c), (d) and (e), optionally also comprising step (b2), under such contacting (cracking) conditions as to crack at least a portion of the hydrocarbons contained in said feed stream and to produce at least one liquid hydrocarbon-containing product stream boiling in a lower temperature range and having a higher API so gravity than said feed stream. In a more preferred embodiment, said cracking catalyst additionally comprises a zeolite.

DETAILED DESCRIPTION OF THE INVENTION

The smectite clay containing starting material of the present invention generally comprises (preferably consist essentially of) clay mineral commonly called smectite, as defined in U.S. Pat. Nos. 4,176,090 and 4,452,910, herein incorporated by reference. Non-limiting examples of suitable smectite clays are bentonite, montmorillonite, chlorite, vermiculite, nontronite, hectorite, saponite and beidellite, preferably bentonite. In one embodiment, the starting material additionally comprises a zeolite such as faujasites, mordenites, X- and Y- zeolites.

Suitable carbon and oxygen containing compounds dissolved in the contacting solution used in step (a) of the preparation procedure of this invention include carbonates and bicarbonates of Li, Na, K, Cs and Rb, and carboxylic acid salts (carboxylates) of Li, Na, K, Cs, Rb and ammonium ($NH_4^+$). Suitable carboxylic acids from which the carboxylates can be derived include aliphatic (straight chain or branched) monocarboxylic, dicarboxylic and tricarboxylic acids (having 1-20 carbon atoms per molecule), which may also contain hydroxyl (OH) side groups. These carboxylic acids also can be cycloaliphatic mono-, di- and tricarboxylic acids (with 5-20 carbon atoms per molecule), which may be unsubstituted or may contain alkyl side groups and/or hydroxyl side groups. Further, these carboxylic acids can also be aromatic mono-, di- and tricarboxylic acids (with 6-20 carbon atoms per molecule), which may be unsubstituted or may contain aliphatic and/or cycloaliphatic and/or hydroxyl side groups.

Non-limiting examples of carboxylic acids from which the alkali metal and ammonium carboxylates, suitable as solutes in step (a), can be formed include formic acid, acetic acid, propionic acid, caproic acid, decanoic acids, hexadecanoic acids, eicosanoic acids, cyclopentanoic acid, cyclohexanoic acid, methylcyclohexanoic acid, dimethylcyclohexanoic acids, tributylcyclooctanoic acids, benzoic acid, benzylic acid, tolyc acid and the like, oxalic acid, pimelic acid, phthalic acid, isophthalic acid, terphthalic acid and the like, malic acid, tartaric acid, lactic acid, citric acid, salicylic acid and the like, and mixtures thereof.

Presently preferred solutes in the contacting solution of step (a) are sodium bicarbonate, potassium bicarbonate, sodium citrate, potassium citrate, ammonium citrate, sodium tartrate, potassium tartrate and ammonium tartrate. The contacting solution generally comprises water or alcohol, such as methanol, ethanol, glycol and glycerol, as solvent, and is preferably aqueous (i.e., comprises water).

The concentration of said at least one dissolved carbon and oxygen containing compound (i.e., carboxylate, bicarbonate, carbonate or mixtures thereof) contained in the contacting solution of step (a) generally exceeds 0.001 mol/l, and can be in the range of from about 0.01 mol/l to about 10 mol/l, preferably from about 0.02 mol/l to about 1.0 mol/l, more preferably from about 0.05 mol/l to about 0.5 mol/l. Preferably, the contacting solution is an aqueous solution wherein the solvent consists essentially of water. Also preferably, the pH of the contacting solution is in the range of from about 3 to about 10, more preferably from about 5 to about 9.

Any suitable ratio of the clay contained in the smectite clay containing starting material to the contacting solution in step (a) can be employed. Generally the weight ratio of contacting solution (preferably containing at least about 0.001 mol/l of at least one carboxylate and/or carbonate and/or bicarbonate, as described above) to the smectite clay contained in the starting material is in the range of from about 1:1 to about 100:1, preferably from about 3:1 to about 20:1. Generally the ratio of the number of g-mols of said at least one dissolved carbon and oxygen containing compound (i.e., carboxylate and/or carbonate and/or bicarbonate) to the number of grams of smectite clay is in the range of from about $10^{-5}$:1 to about 1:1, preferably from about 0.001:1 to about 0.01:1.

In a particularly preferred embodiment, the contacting solution of step (a) additionally comprises at least one alkali metal dithionite, such as $Li_2S_2O_4$, $Na_2S_2O_4$, $K_2S_2O_4$ and the like, preferably $Na_2S_2O_4$. The concentration of the alkali metal dithionite in the contacting solution generally is in the range of from about 0.01 mol to about 1.0 mol/l. The mol ratio of said at least one dissolved carbon and oxygen containing compound (as described above) to the alkali metal dithionite in the contacting solution generally is in the range of from about 1:1 to about 100.1, preferably from about 10:1 to about 50:1. The most preferred contacting solution used in step (a) comprises (preferably consists essentially of) water, sodium citrate, sodium bicarbonate and sodium dithionite. most preferred concentrations are about 0.1-1.0 mol/l sodium citrate, about 0.02-0.5 mol/l sodium bicarbonate and about 0.01-0.2 mo/l sodium dithionite.

Any suitable contacting conditions and contacting means can be employed in contacting step (a). The contacting temperature should exceed about 20° C., and is preferably in the range of from about 20° C. to about 100° C., at atmospheric pressure conditions, more preferably in the range of from about 50° C. to about 100° C. Higher pressures than 1 atm and higher temperatures than 100° C. can be employed, but are presently not preferred. The time of contact between clay and contacting solution in step (a) should exceed about 1 minute, and preferably is in the range of from about 5 minute to about 100 hours, more preferably from about 0.2 to about 10 hours.

Any suitable vessel, preferably equipped with agitating or static mixing means and heating means, can be employed in the contacting steps (a). The contacting vessel also can be equipped with a reflux condenser for carrying out contacting step (a) under reflux conditions so as to keep the concentration of the contacting solution substantially constant during the entire contacting step (a). Agitation of clay and contacting solution is preferred during step (a).

Any separation technique can be used for separating step (b), such as filtration, centrifugation, settling and decanting of the supernatant solution, and the like. The presently preferred separation method in step (b) is filtration of the slurry obtained in step (a) so as to recover the solid product dispersed therein. The thus separated and recovered clay product is preferably further purified by washing with water (or a suitable aqueous solution) in any suitable manner, such as passing water through the filter cake or slurrying the filter cake in water and filtering again.

When the optional, preferred, step (b1) is employed, the separated clay product from step (b) is treated with a solution comprising (preferably consisting essentially of) water and at least one dissolved of inorganic ammonium compounds, alkaline earth metal compounds and lanthanide metal compounds. Non-limiting examples of these compounds which must be at least partially soluble in water, are salts such as $NH_4Cl$, $NH_4F$, $NH_4NO_3$, $NH_4HSO_4$, $(NH_4)_2S_4$ $NH_4$ acetate and the like; $BeCl_2$, $MgCl_2$, $CaCl_2$, $SrCl_2$, $BaCl_2$, $MgF_2$, $CaF_2$, $SrF_2$, $BaF_2$, $Mg(NO_3)_2$, $Ca(NO_3)_2$, $Mg(HSO_4)_2$, $Ca(HSO_4)_2$, $Mg(SO_4)_2$, $Mg(HCO_3)_2$, $Ca(HCO_3)_2$, Mg acetate, Ca acetate and the like; $LaCl_3$, $CeCl_3$, $SmCl_3$, $GdCl_3$, $DyCl_3$, $YbCl_3$, $LaCl_3$, $LaF_3$, $CeF_3$, $La(NO_3)_3$, $Ce(NO_3)_3$, $Sm(NO_3)_3$, $Er(NO_3)_3$, $Lu(NO_3)_3$, $La(HSO_4)_3$, $Ce(HSO_4)_3$, $La_2(SO_4)_3$, $Ce_2(SO_4)_3$, $La(HCO_3)_3$, $Ce(HCO_3)_3$, La acetate and the like. Presently preferred salts for optional, preferred step (b1) are chlorides and nitrates of $NH_4^+$, Mg and La.

The concentration of the compounds (salts) in the contacting solution of steps (b1) can be in the range of from about 0.01 to about 10 mol/l, preferably about 0.1 to about 1.0 mol/l. Generally the weight ratio of the contacting solution used in step (b1) to the clay product obtained in step (b) is in the range of from about 1:1 to about 1000:1, preferably from about 10:1 to about 100:1. Generally the ratio of the number of g-mols of salt in the solution of step (b1) to the number of grams of the clay product obtained in step (b) is in the range of from about $10^{-5}:1$ to about 10:1, preferably from about 0.001:1 to about 0.1:1. The contacting conditions and contacting means as in step (b1) are essentially the same as those described for step (a). Also more preferably, the clay product obtained in step (b1) is separated from the solution used in step (b), essentially in accordance with the separation procedure described for step (b). Most preferably, the separated clay product obtained in step (b2) is then washed with water or an aqueous solution as described above for step (b).

The clay product obtained in step (b) or, preferably, step (b1) or, more preferably, step (b2) is treated in step (c) with an aqueous solution comprising at least one polymeric cationic hydroxy metal complex (sometimes also referred to as oligomer) of at least one of Al, Ti, Zr and Cr, as defined in U.S. Pat. Nos. 4,452,910, 4,238,364, 4,216,188 and 4,176,090, all herein incorporated by reference, preferably a polymeric cationic hydroxy aluminum complex, as defined in several of the above-incorporated patents and also in U.S. Pat. No. 4,271,043, herein incorporated by reference. The preferred polymeric hydroxy aluminum complex is a polymeric hydroxy aluminum chloride, more preferably one contained in Chlorhydrol®, as described in Example I. Generally the Chlorhydrol® solution is diluted with water. Preferably, the aqueous contacting solution contains from about 0.01 to about 10 weight-% (preferably about 0.1-3 weight-%) of polymeric aluminum hydroxy chloride. More preferably, the aqueous solution of the polymeric aluminum hydroxy chloride has been aged at a temperature in the range of about 20° C. to about 100° C. for a period of about 10 minutes to about 300 days, preferably at about 25°-70° C. for about 3 to 50 days, as has been described in U.S. patent application Ser. No. 742,815, now U.S. Pat. No. 4,637,991. Generally, the weight ratio of polymeric aluminum hydroxy compound (preferably halide) to the clay product obtained in step (b) or, preferably, (b1) or, more preferably, (b2) is in the range of from about 0.001:1 to about 10:1, preferably from about 0.01:1 to about 1:1.

Any suitable contacting conditions and contacting means can be employed in step (c) resulting in an increased metal (preferably Al) content in the clay product. The reaction contacting temperature generally is in the range of about 20° C. to about reflux temperature such as about 100° C. at about 1 atm., preferably from about 25° to about 80° C. The pressure in step (c) can be subatmospheric, atmospheric ( about 1 atm; presently preferred) or superatmospheric. The reaction contacting time in step (c) greatly depends on the reaction temperature, and generally is in the range of from about 1 minute to about 10 hours, preferably from about 0.2 to about 2 hours. Preferably, step (c) is carried out in any suitable vessel with agitation and, optionally, under reilux conditions, as described for step (a). Generally the Al content in the clay product increases by about 0.1 to about 10 weight-%, based on the weight of the clay product that is treated in step (c) (i.e., the clay product from step (b) or, alternatively, (b1) or, alternatively, (b2), as described above).

The separation step (d) of the clay product having increased metal content formed in step (c) from the solution containing the polymeric cationic hydroxy metal compound (complex) can be carried by any suitable liquid-solid separation means, such as has been described for step (b). Preferably, the thus-separated clay product having increased metal (preferably Al) content obtained in step (d) is washed with water (or a suitable aqueous solution), as has been described for step (b).

The separated clay product from step (d) is heated (calcined) in any suitable gas atmosphere, preferably in air or another free oxygen containing gas mixture, under such conditions as to form pillared interlayered clay. The calcination conditions comprise a temperature in the range of from about 200° to about 900° C. Preferably, the clay product from step (d) is first heated at a temperature in the range of from about 100° C. to about 200° C. so as to substantially dry the clay product (to less than about 50 weight % $H_2O$). Thereafter, the substantially dried clay product is heated (calcined), preferably at a temperature in the range of from about 300° to about 700° C. (more preferably 500°-650° C.) and a heating time in the range of from about 0.1 to about 100 hours (preferably 1-10 hours). The heating (calcining) conditions of step (e) are such as to drive out a substantial portion of removable water. Preferably the water content in the calcined pillared interlayered clay is less than ahout 5 weight % of removable $H_2O$. The thus calcined pillared interlayered clay can, if desired, be ground to a smaller particle size and sieved.

The pillared interlayered clay of this invention generally contains about 15-35 weight-% $Al_2O_3$ about 60-75 weight-% $SiO_2$ and about 1-5 weight % Ca and/or Mg. The surface area of the pillared interlayered clay, as determined by the BET/$N_2$ method (ASTM D3037), can be in the range of from about 100 to about 500 $m^2/g$, preferably from about 200 to about 350 $m^2/g$. The pillared interlayered clay is quite resistant to steam. Generally, the BET/$N_2$ surface area of the pillared, interlayered clay of this invention, after having been steam treated at about 732° C. and 1 atm steam for about 4 hours, is in the range of from about 40 to about 250 $m^2/g$, preferably from about 50 to about 200 $m^2/g$.

The pillared interlayered clay obtained in step (e) can be intimately admixed with any suitable zeolite such as mordenite, faujasite, X- and Y- zeolites and the like, which optionally can be partially dealuminated and/or rare-earth exchanged, so as to provide suitable catalyst compositions for cracking of hydrocarbon-containing oils. Generally, the weight ratio of the pillared interlayered clay to the zeolite in such composite cracking catalysts is about 30:1-1:5, preferably about 20:1-1:1.

In one embodiment, ground pillared interlayered clay (made by the preparation process of this invention) is slurried with a zeolite in water or another suitable liquid (preferably with agitation), filtered, dried (preferably about at 50°-150° C.) and calcined in air (preferably at about 400°-600° C). In another embodiment, a cracking catalyst composition comprising zeolite (about 5-50 weight-%) and a smectite clay matrix binder (about 95-50 weight %) is heated in accordance with the process comprising the steps (a), (b), (c), (d) and (e), preferably comprising also the additional steps (b1) and (b2), so as to form a catalyst composition comprising zeolite and pillared interlayered clay matrix.

The pillared interlayered clay of this invention can be impregnated with at least one suitable metal promoters such as compounds of transition metals of Groups IIIB, IVB, VB, VIB, VIIB, VIII and IB of the Periodic Table, as defined in "College Chemistry" by Nebergall, Schmidt and Holtzclaw, D. C. Heath and Company, 1972 (e.g., Mo, Ni, Co and the like) at any suitable promoter level (e.g., about 0.5-20 weight % of transition metal). Generally, the impregnation of the pillared interlayered clay is done by solution impregnation or by spraying with a suitable promoter solution, with subsequent drying and calcining. The thus-promoted compositions can be used as catalyst for hydrotreating and/or hydrocracking of hydrocarbon-containing feed streams such as heavy crudes, residua, heavy shale oil fractions and the like.

The pillared interlayered clays produced in accordance with this invention are preferably employed (either alone or, more preferably, in conjunction with zeolites, as described above) as cracking catalyst compositions in processes for catalytically cracking suitable substantially liquid (i.e., substantially liquid at the cracking conditions) hydrocarbon-containing feed streams, such as naphtha streams, light and heavy gas oils, cycle oils, slurry oils, hydrotreated residua and the like, preferably those having an initial boiling point (determined in accordance with ASTM D1160) in excess of about 400° F., preferably a boiling range of about 400°-1200° F., and a API gravity of about 10-35.

Any suitable reactor can be used for the catalytic cracking process of this invention. Generally a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,4Z424,116, herein incorporated by reference. Generally a catalyst regeneration unit (for removal of coke deposits) is combined with the FCC cracking unit as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst composition to oil feed (i.e., hydrocarbon-containing feed) is in the range of from about 2:1 to about 10:1 the contact time between oil feed and catalyst composition is in the range of about 0.2 to about 2.0 seconds, and the cracking temperature is in the range of from about 800° to about 1200° F. Generally steam is added with the oil feed to the FCC reactor so as to aid in the dispersion of the oil as droplets. Generally the weight ratio of steam to oil feed is in the range of from about 0.5:1 to about 0.5. Hydrogen gas can also be present during said cracking operation, which is then referred to as hydrocracking.

The separation of spent (i.e., used) cracking catalyst composition from gaseous and liquid cracked products and the separation into various gaseous and liquid product fractions can be carried out by any conventional separation means, preferably fractional distillation. The most desirable product fraction is gasoline (ASTM boiling range: about 180°-400° F.). Non-limiting examples of such separation schemes are shown in "Petroleum Refining" by James H. Gary and Glenn E. Handwerk, Marcel Dekker, Inc., 1975.

Since generally cracking catalyst compositions are regenerated (preferably by steam stripping for removal of adhered oil, and subsequent oxidation so as to burn off carbon deposits) and then recycled (with or without added fresh catalyst) to the cracking reactor, these recycled catalyst compositions (called equilibrium catalysts) generally contain small amounts of metal (Ni, V) deposited from heavy oil feeds.

The following examples are presented to further illustrate the invention and are not to be considered unduly limiting the scope of this invention.

EXAMPLE I

This example illustrates the preparation of pillared clay by treatment of a clay with an aged aqueous solution of polymeric hydroxy aluminum chloride.

Chlorhydrol®, an aqueous 50 weight-% solution of hydroxy aluminum chloride having an OH:Al atomic ratio of about 2.5:1 and having the approximate chemical formula of $Al_2(OH)_5Cl.2H_2O$ (formula weight: 210), provided by Reheis Chemical Company, a division of Revlon, Inc., Berkely Heights, N.J.) was used as the pillaring agent. 990 cc of Chlorhydrol® was diluted with 8010 cc of distilled water so as to give 9000 cc of pillaring solution, which was then stored at room temperature for about 7 months. 4.1 liters of this aged Chlorohydrol® solution was further diluted with water to a total volume of 9.0 liters, and was used as the pillaring solution.

About 1000 grams of Bentonite clay (BET/$N_2$ surface area: 42 $m^2/g$; supplied by American Colloid Company, Skokie, Ill.) were mixed with 9,000 cc of the above-described pillaring solution. The mixture was heated to 60° C. and stirred at this temperature for about 2 hours. The dispersion was filtered, and the formed aluminum-exchanged, pillared interlayered clay material (hereinafter referred to as pillared clay) was twice redispersed in 5 liters of water and filtered. The thus washed pillared clay was dried at 110° C. for about one day and sieved. A 10-20 mesh fraction was calcined in air at 200° C. for one hour and then at 500° C. for three hours. The BET/$N_2$ surface area of the calcined pillared clay (labeled PC 1) was 270 $m^2/g$. A second pillared clay (labeled PC 2) was prepared substantially in accordance with the procedure for PC 1, with the exception that the pillaring solution was aged for only one week, and had a surface area of 245 $m^2/g$ after calcination at 500° C. for about 3 hours.

Even though the control pillared clays described in this example had a much higher surface area (270 and 245 $m^2/g$, respectively) than unpillared Bentonite clay (46 $m^2/g$), the high surface area of the pillared clay did not prevail when they were subjected to steam-treatment at 732° C./1 atm steam/4 hours. The surface area of control PC 1 decreased from 270 to 7 $m^2/g$ after steam-treatment (=73% reduction in surface area). The surface area of control PC 2 decreased from 245 to 16 $m^2/g$ after steaming (=93% reduction in surface area).

EXAMPLE II

This example illustrates the preparation of pillared clays which are more steam-stable than the control pillared clays described in Example I. Pillared clays described in this Example were prepared by first leaching the clay with aqueous solutions of ammonium or Group IA metal bicarbonates and/or carboxylates and then pillaring the thus-leached clays with Chlorhydrol ®.

The following aqueous leaching solutions were prepared (Note: M=mol/l):

(a) 0.25M sodium citrate (pH: 7.6)
(b) 0.3M ammonium citrate (pH: 5.2)
(c) 0.3M sodium tartrate (pH: 8.1)
(d) 0.08M sodium bicarbonate (pH: 8.4)
(e) 0.09M sodium dithionite ($Na_2 S_2 O_4$; pH: 7.2)
(f) 0.27M sodium citrate+0.09M sodium bicarbonate (pH: 8.6)
(g) 0.27M sodium citrate+0.09M sodium bicarbonate+0.04M sodium dithionite (pH: about 8.0–8.6)

About 800–1,000 cc of each of the solutions (a) through (g), heated to about 70°–75° C., were mixed with about 100–120 grams of Bentonite clay. The mixtures were stirred for about 45 minutes, filtered and washed with about 500 cc of distilled water. The filter cakes of leached clays were stored under about 500 cc of distilled water.

To these slurries of leached clays in 500 cc of water was added about 1.5 liter of a Chlorhydrol ® solution that had been diluted with water so as to contain 0.89 weight-% Al hydroxy chloride and had been aged for 20 days. The mixtures of leached clays and diluted Chlorhydrol ® solution were stirred at about 60° C. for about 2 hours and then filtered. The filter cakes of thus pillared leached clays (labeled PLC 1 through 7) were washed, dried at about 120° C., and sieved. 20–40 mesh fractions were calcined in air at 500° C. for about 2 hours, and their surface BET/$N_2$ areas were determined. Thereafter, these air-calcined samples were heat-treated at 732° C./1 atm steam (4 hrs), and their surface areas were determined again. Pertinent test results are summarized in Table I.

TABLE I

| Pillared Clay | Leaching Solution[1] | Surface Area ($m^2/g$) after 500° C. in air | Surface Area ($m^2/g$) after 732° C. in Steam | % Reduction in Surface Area |
|---|---|---|---|---|
| PC 1 | None | 270 | 72 | 73 |
| PC 2 | None | 245 | 16 | 93 |
| PLC 1 | (a) | 237 | 72 | 70 |
| PLC 2 | (b) | 291 | 107 | 63 |
| PLC 3 | (c) | 236 | 84 | 64 |
| PLC 4 | (d) | 249 | 102 | 68 |
| PLC 5 | (e) | 238 | 52 | 78 |
| PLC 6A | (f) | 322 | 154 | 52 |
| PLC 6B | (f) | 259 | 106 | 59 |
| PLC 7A | (g) | 298 | 167 | 44 |
| PLC 7B | (g) | 292 | 169 | 42 |
| PLC 7C | (g) | 296 | 143 | 52 |

[1]Leaching solutions were defined earlier in this example.

Data in Table I show that leaching with aqueous solutions of ammonium citrate, sodium citrate, sodium tartrate and sodium bicarbonate had a slight beneficial effect on the steam stability, i.e., decreased reduction in surface area after heating in steam of pillared clays (compare PLC 1-4 with PC 1 and 2). The steam stability of pillared clays was further enhanced by leaching with an aqueous mixture of sodium citrate and bicarbonate (PLC 6A and 6B). The highest steam stability was attained when the leaching solution contained also sodium dithionite in addition to sodium citrate/bicarbonate (PLC 7A-C). This latter result was especially surprising because leaching with sodium dithionite alone was essentially not effective in enhancing the steam stability of pillared clay (compare PLC 5 with PC 1).

Based on the above test results, the preferred agent for leaching clays is a mixture of alkali metal citrate and alkali metal bicarbonate, more preferably containing additionally alkali metal dithionite.

Table II shows the effect of leaching of Bentonite clay with an aqueous solution containing sodium citrate, sodium bicarbonate and sodium dithionite on the chemical composition of the clay, and also the corresponding effect of pillaring thus-leached and unleached Bentonite clay with Chlorhydrol ® solutions. The analytical data for the four materials are on a water-free basis.

TABLE II

| Component | Weight % of Components | | | |
|---|---|---|---|---|
| | Bentonite Clay[1] | Leached[2] Bentonite Clay | Pillared Bentonite Clay | Pillared Leached Bentonite Clay |
| $SiO_2$ | 70.3 | 70.2 | 67.3 | 64.3 |
| $Al_2O_3$ | 19.7 | 19.9 | 25.8 | 29.8 |
| $Fe_2O_3$ | 3.5 | 3.4 | 2.9 | 3.3 |
| FeO | 0.4 | 0.0 | 0.0 | 0.0 |
| MgO | 2.5 | 2.2 | 1.5 | 1.8 |
| $Na_2O$ | 1.8 | 3.4 | 0.6 | 0.3 |
| $K_2O$ | 0.5 | 0.4 | 0.5 | 0.4 |
| CaO | 1.2 | 0.3 | 0.6 | 0.2 |
| Others | 0.2 | 0.2 | 0.2 | 0.2 |

[1]as received; untreated.
[2]leached 45 minutes at 70° C. with aqueous solution of sodium citrate, sodium bicarbonate and sodium dithionite.

Data in Table II clearly show that the amount of alumina, and thus the extent of formed alumina-containing pillars, is greater in pillared leached clay than in pillared unleached clay.

EXAMPLE III

This example illustrates the use of some of the steam-treated pillared cays described in Examples I and II in microactivity cracking tests (MAT), in accordance with ASTM D3907-80 (reactor temperature: 900° F., catalyst:oil weight ratio of 3:1). The oil feed was a vacuum gas oil having a boiling range of about 700° to 900° F. and $API_{60}$ gravity of 27. MAT conversion results are summarize in Table III.

TABLE III

| Pillared Clay[1] | Leaching Solution | Surface Area ($m^2/g$)[5] | MAT-Conversion (Weight %) |
| --- | --- | --- | --- |
| PC 1 | None | 72 | 39.5 |
| PC 2 | None | 16 | 19.0 |
| PLC 2 | (b)[2] | 107 | 12.1 |
| PLC 3 | (c)[3] | 84 | 7.4 |
| PLC 7A | (g)[4] | 167 | 26.5 |
| PLC 7C | (g)[4] | 143 | 30.5 |

[1]Note: All pillared clays had been steam-treated at 732° C. and 1 atm steam for 4 hours.
[2]leached with an aqueous solution of ammonium citrate.
[3]leached with an aqueous solution of sodium tartrate
[4]leached with an aqueous solution containing sodium citrate, sodium bicarbonate and sodium dithionite.
[5]after steam treatment.

Data in Table III show that pillared leached clays, especially those that had been leached with an aqueous solution containing alkali metal citrate, alkali metal bicarbonate and alkali metal dithionite, were effective as cracking catalysts.

EXAMPLE IV

This example illustrates a modification in the preparation of pillared leached clays (PLC) so as to improve their cracking activity.

50 grams of clays that had been leached with a leaching agent substantially in accordance with the procedure described in the first two paragraphs of Example II were slurried in 300 cc of deionized water (for a control run, unleached Bentonite clays was used). To this slurry was added either 330 cc of an aqueous 0.5M $NH_4Cl$ solution or 330 cc of an aqueous 0.13M $MgCl_2$ solution or 330 cc of an aqueous 0.13M $La(NO_3)_3$ solution. The obtained mixture (about 660 cc) was stirred at 60° C. for about 1 hour so as to introduce $NH_4$ or Mg or La into the clay. The slurry was filtered, and the filter cake was slurried in 300 cc of deionized water and then ion-exchanged again, as described above (i.e., by adding 330 cc of 0.5M $NH_4Cl$ or 0.13M $MgCl_2$ or 0.13M $La(NO_3)_3$, stirring at 60° C./1 hr., and filtering)

The washed ion-exchanged clays were then treated with the Chlorhydrol ® pillaring solution, substantially as described in the third paragraph of Example II. MAT converseion results of leached, ion-exhachanged and pillared clays, after steam-treatment at about 732° C.1 atm steam for about 4 hours, are summarized in Table IV. MAT test condition were essentially the same as those described in Example III.

TABLE IV

| Pillared Clay | Leaching Agent | Ion-Exchange Agent | Surface Area after Steaming ($m^2/g$) | MAT-Conv. (Weight %) |
| --- | --- | --- | --- | --- |
| PC 3 | None | $NH_4Cl$ | 61 | 7.7 |
| PLC 8 | $NH_4$ Citrate | None | 147 | 15.5 |
| PLC 9 | $NH_4$ Citrate | $NH_4Cl$ | 178 | 43.0 |
| PLC 10 | Na Tartrate | $NH_4Cl$ | 122 | 28.4; 29.2 |
| PLC 11 | Na Citrate + Na Bicarbonate + Na Dithionite | $MgCl_2$ | 86 | 39.6 |
| PLC 12 | Na Citrate + Na Bicarbonate + Na Dithionite | $NH_4Cl$ | 99 | 49.0; 39.0; 42.5 |
| PLC 13 | Na Citrate + Na Bicarbonate + Na Dithionite | $NH_4Cl$ | 145 | 58.5; 59.6; 54.3 |
| PLC 14 | Na Citrate + Na Bicarbonate + Na Dithionite | $La(NO_3)_3$ | 116 | 48.4; 39.8; 40.7 |
| PLC 15 | Na Citrate + Na Bicarbonate + Na Dithionite | $NH_4Cl$ + $La(NO_3)_3$ | 117 | 50.9; 50.4; 39.5 |
| PLC 16 | Na Citrate + Na Bicarbonate + Na Dithionite | $NH_4Cl$ | 153 | 52.0; 54.0 |
| PLC 17 | Na Citrate + Na Bicarbonate + Na Dithionite | $La(NO_3)_3$ | 128 | 47.4; 52.2 |
| PLC 18 | Na Citrate + Na Bicarbonate + Na Dithionite | $NH_4Cl$ + $La(NO_3)_3$ | 118 | 53.7; 45.0; 49.9 |

Data in Table IV clearly show that the combination of leaching (especially with a solution containing alkali metal citrate, alkali metal bicarbonate and alkali metal dithionite) and ion-exchange (especially with an ammonium salt) before pillaring produced pillared clays of improved cracking activity (compare PLC 9-18 with pillared clays PC 3 and PLC 8).

EXAMPLE V

This example illustrates the preparation of cracking catalysts comprising zeolite and pillared leached clay (PLC) as matrix. Two methods of combining zeolite and PLC are described.

In the first method, pillared, leached clay was compounded with zeolite. About 110 grams of <100 mesh, dry PLC (similar to PLC 7C; leached with aqueous Na citrate+Na bicarbonate+Na dithionite; not ion-exchanged) were slurried in 3 liters of deionized water. To this slurry were added 10 grams of rare earth-exchanged Y-zeolite (supplied by Union Carbide Corporation, Danbury, Conn.; containing 14.1 weight-% rare earth and 2.53 weight-% Na). The resulting slurry of PLC and zeolite was stirred for 1 hour and filtered. The filter cake was dried at 125° C. for about 12 days and then ground. A 20-40 mesh sample was calcined in air at 500° C. for 2 hours and then heated at 732° C. in steam (1 atm) for about 5 hours and in $N_2$ for about 1 hour. In control tests, unpillared Bentonite clay and a pillared unleached clay (PC) was used instead of PLC.

In the second method, a blend comprising zeolite and leached (but unpillared) clay was subjected to pillaring with a Chlorhydrol ® solution. In one example, about 110 grams of leached, unpillared Bentonite clay (<100 mesh; leached with aqueous solution of Na citrate+ Na bicarbonate+Na dithionite; see Example II, first two paragraphs) and 10 grams of Y-zeolite (described above) were added to 2 liters of as 0.89 weight-% Chlorhydrol ® solution. The mixture was stirred for two hours at 65° C. and filtered. The filter cake was washed twice with 3 liters of ion-exchanged water, dried at 125° C. for about 16 hours and ground. A 20-40 mesh fraction was calcined and steam-treated as described above in this Example. In control runs, unleached Bentonite clay was used in lieu of leached Bentonite clay. In additional tests, a portion of clay was replaced with silica gel.

Pertinent MAT conversion data (obtained at test conditions described in Example II, employing a vacuum gas oil of $API_{60}=27$) are summarized in Table V.

TABLE V

| Catalyst | Surface Area after Steaming $(m^2/g)$ | MAT-Conv. Weight % |
|---|---|---|
| 10 Wt % Y-Zeolite + 90 Wt % Bentonite Clay | 51 | 28 |
| 10 Wt % Y-Zeolite + 90 Wt % Pillared Unleached Clay | 89 | 65 |
| 10 Wt % Y-Zeolite + 90 Wt % Pillared Leached Clay | 146 | 83 |
| Chlorhydrol-Treated Mixture of 10 Wt % Y-Zeolite + 90 Wt % Bentonite Clay | — | 71;79[1] |
| Chlorhydrol-Treated Mixture of 10 Wt % Y-Zeolite + 90 Wt % Leached Clay | | 81[1] |
| Chlorhydrol-Treated Mixture of 10 Wt % Y-Zeolite + 45 Wt % Silica + 45 Wt % Bentonite Clay | — | 69 |
| Chlorhydrol-Treated Mixture of 10 Wt % Y-Zeolite + 45 Wt % Silica + 45 Wt % Leached Clay | — | 75 |

[1] a vacuum gas oil having $API_{60}$ gravity of 30 was used for these two tests.

Data in Table V clearly show that a blend of zeolite and pillared leached clay (not ion-exchanged) exhibited superior cracking activity versus blends of zeolite and unpillared Bentonite clay and blends of zeolite and pillared unleached clay. Furthermore, data in Table V show that Chlorhydrol ®-treated blends comprising zeolite and leached clay exhibited greater cracking activity than Chlorhydrol ®-treated blends comprising zeolite and unleached Bentonite clays.

Reasonable variations and modifications are possible within the scope of the disclosure and appended claims.

That which is claimed is:

1. A cracking process comprising the step of contacting a substantially liquid hydrocarbon-containing feed stream with a solid catalyst composition comprising pillared interlayered clay, under such cracking conditions as to crack at least a portion of the hydrocarbons contained in said feed stream and to produce at least one liquid hydrocarbon-containing product stream boiling in a lower temperature range and having a higher API gravity than said feed stream;

wherein said solid catalyst composition has been prepared by a preparation process comprising the steps of:

(a) contacting a smectite clay containing material with a solution comprising at least one dissolved carbon and oxygen containing compound selected from the group consisting of ammonium carboxylates containing from 1 to 20 carbon atoms per carboxylate group, alkali metal carboxylates containing from 1 to 20 carbon atoms per carboxylate group, alkali metal bicarbonates and alkali metal carbonates, at a temperature of at least 20° C. and for a period of time of at least one minute;

(b) separating the clay product formed in step (a) from said solution;

(b1) contacting the separated clay product obtained in step (b) with a solution comprising water and at least one dissolved compound selected from the group consisting of inorganic ammonium compounds, compounds of Group IIA metals and compounds of lanthanides, so as to incorporate ionic species selected from the group consisting of ammonium ion, Group IIA metal ions, lanthanide ions and mixtures of two or more of these ions into said clay product obtained in step (b);

(c) contacting the clay product which has undergone treatment comprising steps (a), (b) and (b1) with a solution comprising at least one polymeric cationic hydroxy metal complex of at least one metal selected from the group consisting of aluminum, titanium, zirconium and chromium, under such conditions as to increase the content of said metal in said clay product which has undergone treatment comprising steps (a), (b) and (b1);

(d) separating the clay product having increased metal content formed in step (c) from said solution comprising said at least one polymeric cationic hydroxy metal complex; and (e) heating the separated clay product having increased metal content obtained in step (d) under such conditions as to remove at least a portion of water from said separated clay product obtained in step (d) so as to form a pillared interlayered clay product.

2. A cracking process in accordance with claim 1, wherein the solution used in step (a) additionally comprises at least one alkali metal dithionite.

3. A cracking process in accordance with claim 1, wherein said smectite clay containing material used in step (a) is a composition comprising zeolite and smectite clay.

4. A cracking cracking process in accordance with claim 1, wherein said preparation process comprises the additional step of intimately mixing the pillared interlayered clay product obtained in step (e) with a zeolite.

5. A cracking process in accordance with claim 1, wherein said preparation process comprises the steps of:

(a) contacting a smectite clay containing material with a solution comprising water and at least one dissolved carbon and oxygen containing compound selected from the group consisting of ammonium carboxylates containing from 1 to 20 carbon atoms per carboxylate group, alkali metal carboxylates containing from 1 to 20 carbon atoms per carboxylate group, alkali metal bicarbonates and alkali metal carbonates, at a temperature in the range of from about 20° to about 100° C. and for a period of time in the range of from about 5 minutes to about 100 hours;

(b) separating the clay product formed in step (a) from said contacting solution;

(b1) contacting the separated clay product obtained in step (b) with a solution comprising water and at least one dissolved compound selected from the group consisting of inorganic ammonium compounds, compounds of Group IIA metals and compounds of lanthanides, so as to incorporate ionic species selected from the group consisting of ammonium ion, Group IIA metal ions, lanthanide ions and mixtures of two or more of these ions into said clay product obtained in step (b);

(c) contacting the clay product which has undergone treatment comprising steps (a), (b) and (b1) with a solution comprising water and at least one polymeric cationic hydroxy metal complex of aluminum under such conditions as to increase the content of aluminum in said clay product which has undergone treatment comprising steps (a), (b) and (b1);

(d) separating the clay product having increased aluminum content formed in step (c) from said solution comprising said at least one polymeric cationic hydroxy metal complex of aluminum; and (e) heating the separated clay product having increased aluminum content obtained in step (d) under such conditions as to remove at least a portion of water from said separated clay product obtained in step (d) so as to form a pillared interlayered clay product.

6. A cracking process in accordance with claim 5, wherein said preparation process comprises the additional step (b2) of separating the clay product obtained in step (b1) from the solution used in step (b1), and wherein step (c) is carried out with the clay product obtained in step (b2).

7. A cracking process in accordance with claim 5, wherein the smectite clay in said smectite clay containing material is selected from the group consisting of bentonite, montmorillonite, chlorite, vermiculite, nontronite, hectorite, saponite and beidellite.

8. A cracking process in accordance with claim 7, wherein said smectite clay is bentonite.

9. A cracking process in accordance with claim 5, wherein said smectite clay containing material used in step (a) is a composition comprising zeolite and smectite clay.

10. A cracking process in accordance with claim 9, wherein said smectite clay containing material used in step (a) is a composition comprising about 5-50 weight-% zeolite and about 95-50 weight percent smectite clay matrix, and in step (e) a composition comprising zeolite and interlayered clay matrix is formed.

11. A cracking process in accordance with claim 10 wherein said zeolite is selected from the group consisting of faujasites, mordenites, X-zeolites and Y-zeolites.

12. A cracking process in accordance with claim 5, wherein said preparation process comprises the additional step of intimately admixing the pillared interlayered clay product obtained in step (e) with zeolite at a weight ratio of about 30:1 to about 1:5.

13. A cracking process in accordance with claim 12, wherein said zeolite is selected from the group consisting of faujasites, mordenites, X-zeolites and Y-zeolites.

14. A cracking process in accordance with claim 5, wherein said solution used in step (a) additionally comprises alkali metal dithionite.

15. A cracking process in accordance with claim 14 wherein said solution used in step (a) comprises sodium citrate, sodium bicarbonate and sodium dithionite.

16. A cracking process in accordance with claim 5, wherein said substantially liquid hydrocarbon-containing feed stream has an initial boiling point, determined in accordance with ASTM D1160, in excess of about 400° F. and API gravity in the range of from about 10 to about 35, and said cracking conditions comprise a weight ratio of said solid catalyst composition to said hydrocarbon-containing feed stream in the range of from about 2:1 to about 10:1 and a temperature in the range of from about 800° to about 1200° F.

17. A cracking process in accordance with claim 5, wherein steam is present during said cracking process, and the weight ratio of steam to said hydrocarbon-containing feed stream is in the range of from about 0:01:1 to about 0.5:1.

18. A cracking process in accordance with claim 1, wherein hydrogen gas is present during said cracking.

19. A cracking process comprising the step of contacting a substantially liquid hydrocarbon-containing feed stream with a solid cracking catalyst composition comprising zeolite and pillared interlayered clay, under such cracking conditions as to crack at least a portion of the hydrocarbons contained in said feed stream and to produce at least one liquid hydrocarbon-containing product stream boiling in a lower temperature range and having a higher API gravity than said feed stream;

wherein said pillared interlayered clay portion of said solid catalyst composition has been prepared by a preparation process comprising the steps of:

(a) contacting a smectite clay containing material with a solution comprising at least one dissolved carbon and oxygen containing compound selected from the group consisting of ammonium carboxylates containing from 1 to 20 carbon atoms per carboxylate group, alkali metal carboxylates containing from 1 to 20 carbon atoms per carboxylate group, alkali metal bicarbonates and alkali metal carbonates, at a temperature of at least 20° C. and for a a period of time of at least one minute;

(b) separating the clay product formed in step (a) from said contacting solution;

(c) contacting the clay product which has undergone treatment comprising steps (a) and (b) with a solution comprising at least one polymeric cationic hydroxy metal complex of at least one metal selected from the group consisting of aluminum, titanium, zirconium and chromium, under such conditions as to increase the content of said metal in said clay product which has undergone treatment comprising steps (a) and (b);

(d) separating the clay product having increased metal content formed in step (c) from said solution comprising the polymeric cationic hydroxy metal complex; and (e) heating the separated clay product having increased metal content obtained in step (d) under such conditions as to remove at least a portion of water from said separated clay product obtained in step (d) so as to form a pillared interlayered clay product.

20. A cracking process in accordance with claim 19, wherein said smectite clay containing material used in step (a) is a composition comprising zeolite and smectite clay.

21. A cracking process in accordance with claim 19, wherein said preparation process comprises the additional step of intimately mixing the pillared interlayered clay product obtained in step (e) with a zeolite.

22. A cracking process in accordance with claim 19, wherein the solution used in step (a) additionally comprises at least one alkali metal dithionite.

23. A cracking process in accordance with claim 19, wherein said preparation process comprises the steps of:

(a) contacting a smectite clay containing material with a solution comprising water and at least one dissolved carbon and oxygen containing compound selected from the group consisting of ammonium carboxylates containing from 1 to 20 carbon atoms per carboxylate group, alkali metal carboxylates containing from 1 to 20 carbon atoms per carboxylate group, alkali metal bicarbonates and alkali metal carbonates, at a temperature in the range of from about 20° to about 100° C. and for a period of in the range of from about 5 minutes to about 100 hours;

(b) separating the clay product formed in step (a) from said contacting solution;

(c) contacting the clay product which has undergone treatment comprising steps (a) and (b) with a solution comprising water and at least one polymeric cationic hydroxy metal complex of aluminum under such conditions as to increase the content of aluminum in said clay product which has undergone treatment comprising steps (a) and (b);

(d) separating the clay product having increased metal content formed in step (c) from said solution comprising said at least one polymeric cationic hydroxy metal complex of aluminum; and (e) heating the separated clay product having increased aluminum content obtained in step (d) under such conditions as to remove at least a portion of water from said separated clay product obtained in step (d) so as to form a pillared interlayered clay.

24. A cracking process in accordance with claim 23, wherein the smectite clay in said smectite clay containing material is selected from the group consisting of bentonite, montmorillonite, chlorite, vermiculite, nontronite, hectorite, saponite and beidellite.

25. A process in accordance with claim 24, wherein said smectite clay is bentonite.

26. A process in accordance with claim 23, wherein said smectite clay containing material used in step (a) is a composition comprising zeolite and smectite clay.

27. A process in accordance with claim 23, wherein said smectite clay containing material used in step (a) is a composition comprising about 5–50 weight-% zeolite and about 95–50 weight percent smectite clay matrix, and in step (e) a composition comprising zeolite and interlayered clay matrix is formed.

28. A process in accordance with claim 27, wherein said zeolite is selected from the group consisting of faujasites, mordenites, X-zeolites and Y-zeolites.

29. A process in accordance with claim 23, wherein said preparation process comprises the additional step of intimately admixing the pillared interlayered clay product obtained in step (e) with zeolite at a weight ratio of about 30:1 to about 1:5.

30. A process in accordance with claim 29, wherein said zeolite is selected from the group consisting of faujasites, mordenites, X-zeolites and Y-zeolites.

31. A cracking process in accordance with claim 22, wherein said solution used in step (a) additionally comprises alkali metal dithionite.

32. A cracking process in accordance with claim 31, wherein said solution used in step (a) comprises sodium citrate, sodium bicarbonate and sodium dithionite.

33. A cracking process in accordance with claim 23, wherein said substantially liquid hydrocarbon-containing feed stream has an initial boiling point, determined in accordance with ASTM D1160, in excess of about 400° F. and API gravity in the range of from about 10 to about 35, and said cracking conditions comprise a weight ratio of said solid catalyst composition to said hydrocarbon-containing feed stream in the range of from about 2:1 to about 10:1 and a temperature in the range of from about 800° to about 1200° F.

34. A cracking process in accordance with claim 23, wherein steam is present during said cracking process, and the weight ratio of steam to said hydrocarbon-containing feed stream is in the range of from about 0.01:1 to about 0.5:1.

35. A cracking process in accordance with claim 19, wherein hydrogen gas is present during said cracking.

* * * * *